United States Patent [19]

Takeshima

[11] 4,386,043

[45] May 31, 1983

[54] METHOD OF AND APPARATUS FOR MOLDING A CONTINUOUS THERMOPLASTIC COUPLING ELEMENT STRIP FOR SLIDE FASTENERS

[75] Inventor: Kiyoshi Takeshima, Namerikawa, Japan

[73] Assignee: Yoshida Kogyo K. K., Tokyo, Japan

[21] Appl. No.: 291,817

[22] Filed: Aug. 10, 1981

[30] Foreign Application Priority Data

Aug. 15, 1980 [JP] Japan ................................ 55-112467

[51] Int. Cl.³ .............................................. B29D 5/00
[52] U.S. Cl. .................................... 264/167; 264/261;
 264/328.8; 264/328.11; 264/328.12; 425/545;
 425/572; 425/575; 425/376 A; 425/814
[58] Field of Search .............. 264/167, 328.11, 328.12,
 264/328.8, 261, 295, 166; 425/383, 814, DIG.
 34, 376 A, 545, 588, 572, 575

[56] References Cited

U.S. PATENT DOCUMENTS

| 2,583,035 | 1/1952 | Winterhalter | 264/328.8 |
| 2,584,916 | 2/1952 | Poux | 264/328.8 |
| 3,328,857 | 7/1967 | Burbank | 24/205.13 |
| 3,445,915 | 5/1969 | Cuckson et al. | 264/295 |
| 3,880,978 | 4/1975 | Apostoleris et al. | 264/328.12 |
| 4,084,296 | 4/1978 | Moertel | 264/295 |
| 4,096,225 | 6/1978 | Kowalski | 264/295 |
| 4,163,768 | 8/1979 | Stephens | 425/814 |
| 4,176,149 | 11/1979 | Moertel | 264/328.8 |
| 4,252,586 | 2/1981 | Scott | 264/261 |
| 4,299,441 | 11/1981 | Parker | 264/328.12 |

Primary Examiner—Jeffery R. Thurlow
Attorney, Agent, or Firm—Hill, Van Santen, Steadman, Chiara & Simpson

[57] ABSTRACT

A continuous zigzag-shaped coupling element strip, for use in the production of slide fasteners, is produced on a rotating die wheel having an endless zigzag-shaped peripheral cavity receptive of heated thermoplastic material delivered from a fixed extrusion nozzle. The cavity has a plurality of bottlenecks or retarding means to restrict or retard the flow of the delivered thermoplastic material in the cavity so as to retain much of the thermoplastic material in central and transverse cavity portions that correspond to head and leg portions of a coupling element.

6 Claims, 25 Drawing Figures

METHOD OF AND APPARATUS FOR MOLDING A CONTINUOUS THERMOPLASTIC COUPLING ELEMENT STRIP FOR SLIDE FASTENERS

BACKGROUND OF THE INVENTION

1. Field of the Invention

The present invention relates generally to slide fasteners, and more particularly to a method of and apparatus for molding a continuous zigzag-shaped strip of thermoplastic coupling elements for use in the production of slide fasteners.

2. Prior Art

Various attempts have been made to produce a continuous zigzag-shaped strip of thermoplastic coupling elements for use in the production of slide fasteners. To this end it has been known to mold the continuous strip on a die wheel having an endless zigzag-shaped peripheral cavity. The zigzag-shaped cavity includes a plurality of parallel spaced transverse sections and a plurality of longitudinal sections disposed alternately at opposite sides of the cavity and each extending between an adjacent pair of the transverse sections. As the die wheel is continuously rotated, the cavity is advanced such that the transverse sections successively pass a fixed extrusion nozzle to receive heated thermoplastic material extruded from the extrusion nozzle. At that time a predetermined amount of the thermoplastic material is delivered to the individual transverse cavity section from its midportion, and the delivered thermoplastic material-flows rapidly spread to adjacent longitudinal sections and thence into the preceding and succeeding transverse sections. This rapid flow would often cause staggering dimensions of articles (coupling elements) produced, and generation of air cells in the articles.

SUMMARY OF THE INVENTION

It is an object of the present invention to provide a method of producing a continuous zigzag-shaped strip of thermoplastic coupling elements having exactly the same dimensions with no cells generated in the coupling elements.

Another object of the invention is to provide an improved die wheel for use in carrying out the above-mentioned method.

According to the invention, an endless zigzag-shaped peripheral cavity of a die wheel includes a succession of substantially parallel transverse sections receptive of heated thermoplastic material delivered from a fixed extrusion nozzle. Each of the transverse cavity sections has at its opposite ends a pair of bottlenecks to restrict or retard the flow of the delivered thermoplastic material from the midportion of the individual transverse cavity section to adjacent longitudinal cavity sections that lead to the preceding and succeeding transverse sections, thereby retaining much of the delivered thermoplastic material adjacent to the midportion of the individual transverse cavity section.

Many other advantages, features and additional objects of the present invention will become manifest to those versed in the art upon making reference to the detailed description and the accompanying drawings in which several preferred structural embodiments incorporating the principles of the present invention are shown by way of illustrative example.

DETAILED DESCRIPTION

Figure 1:
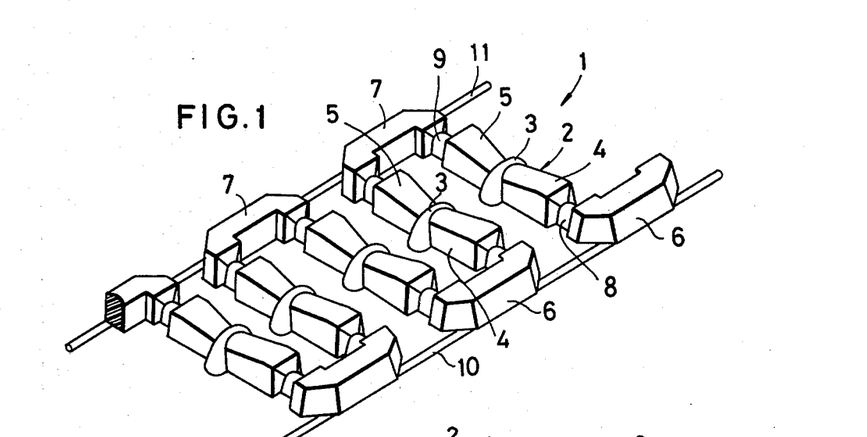
FIG. 1 is a fragmentary perspective view of a continuous coupling element strip produced by the method of the present invention.
Figure 10:
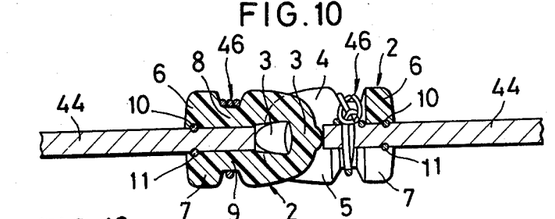
FIG. 10 is a cross-sectional view taken along line X—X of FIG. 9.

As shown in FIG. 1, a continuous zigzag-shaped thermoplastic coupling element strip 1 includes a series of substantially parallel spaced coupling elements 2 interconnected by a plurality of first and second connecting portions 6,7 alternately disposed at opposite sides of the strip 1 and extending one between each adjacent pair of the coupling elements 2. Each coupling element 2, as it is spread flat before being bent into a U shape (FIG. 2), has a head portion 3 and a pair of first and second leg portions 4,5 extending in opposite directions from the head portion 3 and terminating in a pair of slender ends 8,9, respectively. A pair of first and second connecting threads 10,11 extends longitudinally along opposite sides of the strip 1 and has longitudinally spaced portions which are incompletely embedded in the connecting portions 6,7, as best shown in FIG. 10.

Figure 2:
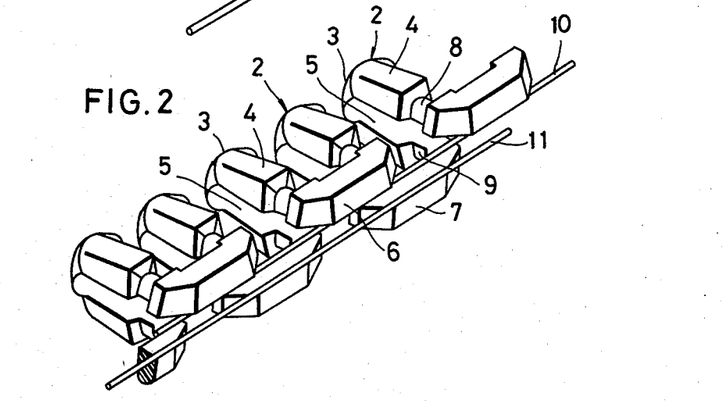
FIG. 2 is a fragmentary perspective view of the strip of FIG. 1 after having been folded on itself along its length.
Figure 9:
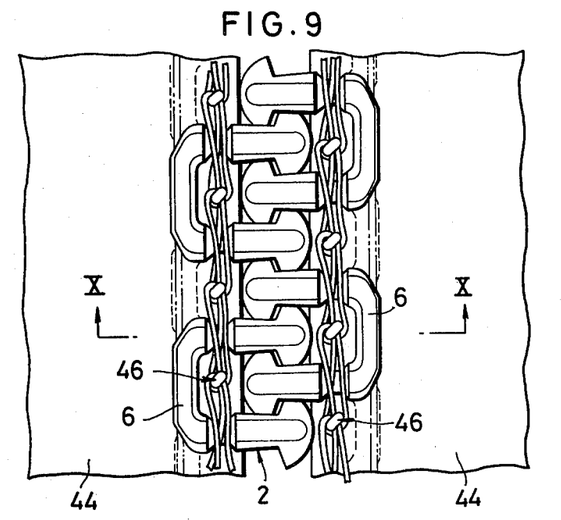
FIG. 9 is a fragmentary plan view of a pair of continuous slide fastener stringers produced with the use of the strip of FIG. 2.

FIG. 2 illustrates the strip 1 having been folded on itself along its longitudinal center line by a folding machine 17 (FIG. 3), with the individual coupling elements 2 bent into a U shape. The strip 1 is thus ready for use in the production of slide fastener stringers (FIGS. 9 and 10).

Figure 3:
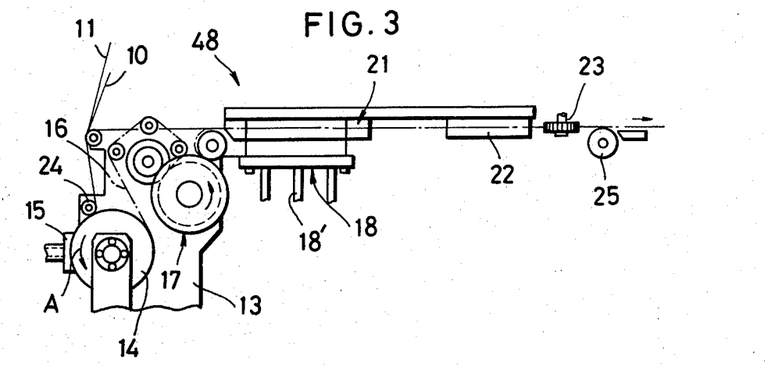
FIG. 3 is a schematic side elevational view of an apparatus for carrying out the method of the invention.
Figure 4:
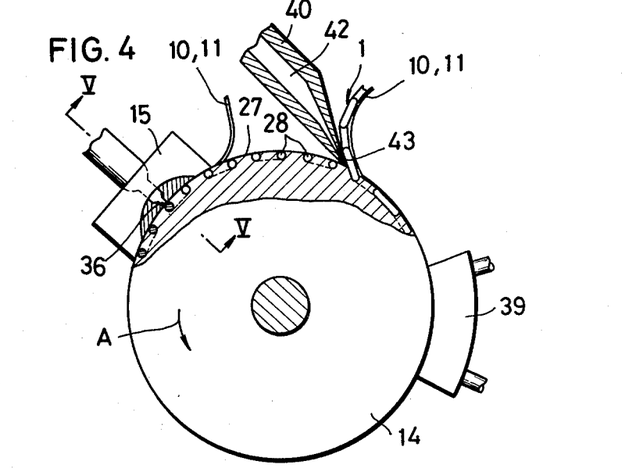
FIG. 4 is an enlarged side elevational view, partly in cross section, of a die wheel of FIG. 3, showing the strip being produced.
Figure 6:
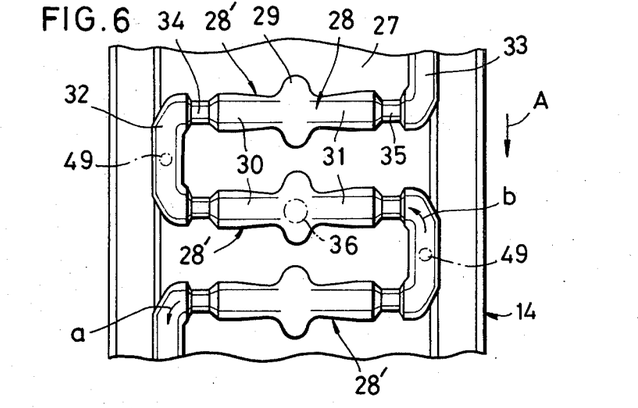
FIG. 6 is an enlarged fragmentary plan view of a peripheral surface of the die wheel of FIG. 4, showing a portion of an endless cavity.

The strip of FIGS. 1 and 2 is produced on an apparatus 48 (FIG. 3) in the following manner. As shown in FIGS. 3 and 4, the first and second connecting threads 10,11 are guided by a guide roller 24 and wound on a die wheel 14 along opposite sides of an endless zigzag-shaped cavity 28 extending in and around the periphery 27 of the die wheel 14. The zigzag-shaped cavity 28, as best shown in FIG. 6, includes a plurality of substantially parallel transverse sections 28' and a plurality of first and second longitudinal sections 32,33 disposed alternately at opposite sides of the cavity 28 and extending one between each adjacent pair of the transverse sections 28'. Having a contour corresponding the shape of a single coupling element 2, each transverse cavity section 28' has an enlarged central portion 29 for forming a head portion 3 of the coupling element 2 and a pair of first and second transverse portions 30,31 extending in opposite directions from the central portion 29 for forming a pair of first and second leg portions 4,5 of the coupling element 2. Each longitudinal cavity portion 32,33 is adapted to form a connecting portion 6,7 extending between an adjacent pair of the coupling element 2.

Figure 7:
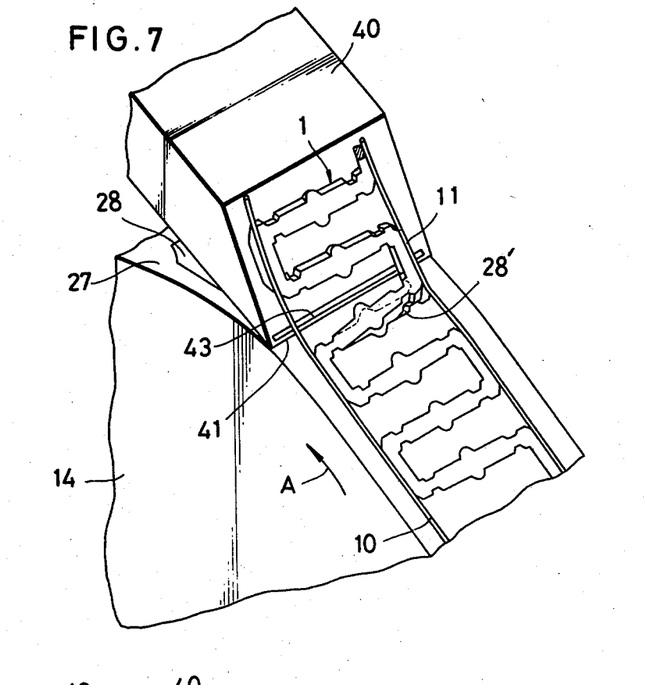
FIG. 7 is an enlarged perspective view of a portion of the die wheel of FIG. 4, showing a scraper.
Figure 8:
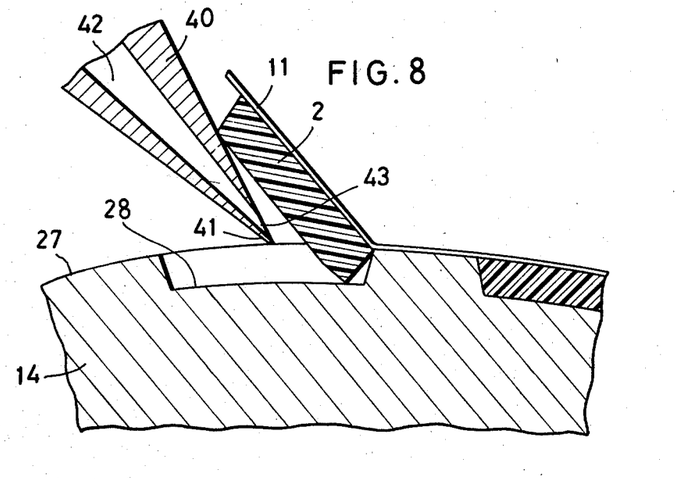
FIG. 8 is an enlarged cross-sectional view of a portion of the die wheel of FIG. 4, showing the manner in which the strip is removed by the scraper.

As the die wheel 14 is continuously rotated in the direction indicated by an arrow A, the cavity 28 is advanced such that the central portions 29 of the transverse sections 28' successively pass a fixed extrusion nozzle 36 of an extrusion machine 15 to receive heated thermoplastic material extruded from the extrusion nozzle 36. At that time a predetermined amount of the thermoplastic material is delivered to the individual transverse cavity sections 28'. The extrusion machine 15 includes an unnumbered closure shoe coacting with the profile of the die wheel 14 to hold the delivered thermoplastic material in the cavity 28. Subsequently, the thermoplastic material in the cavity 28 is cooled by a cooling machine 39 to become solid enough for removal from the die wheel 14 by a scraper 40 (FIGS. 4,7,8). The scraper 40 has a taper end 41 disposed substantially tangentially of the periphery 27 of the die wheel 14. To expedite the removal of the strip 1 molded in the cavity, pressurized air is normally blown through a hollow chamber 42 out of a mouth 43. Thus the continuous strip 1 of FIG. 1 has been produced.

After having been removed from the die wheel 14, the strip 1 of FIG. 1 is fed along a path 16 (FIG. 3) and is then folded on itself along its central line by a folding machine 17 in which the individual coupling elements 2 are bent into a U shape (FIG. 2).

The folded strip 1 is then heat-set at a secondary heating unit 18 having a pipe 18' for introducing heated air. Concurrently with this heat-setting, the strip 1 is shaped by a shaping die 21 into a final configuration. Finally the strip 1 is cooled by a secondary cooling machine 22 and is then discharged out of the apparatus 48 by a feeding machine 23 and a discharge roller 25.

Figure 5:
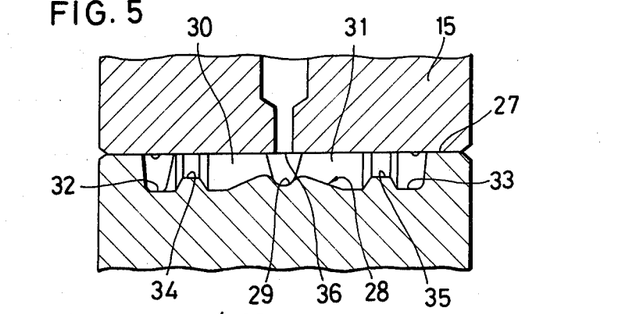
FIG. 5 is an enlarged fragmentary cross-sectional view taken along line V—V of FIG. 4.

As shown in FIGS. 5 and 6, the first and second portions 30,31 of each transverse cavity section 28' have at their outer ends a pair of first and second bottlenecks or restrictions 34,35, respectively, having reduced width and depth.

As described above, the thermoplastic material extruded from the extrusion nozzle 36 is delivered to the transverse cavity sections 28' successively at their respective central portions 29 as the die wheel 14 is continuously rotated in the direction indicated by the arrow A. The delivered thermoplastic material starts to flow into adjacent first and second longitudinal sections 32,33 through the first and second transverse portions 30,31. Because of the bottlenecks 34,35, the flow of the delivered thermoplastic material from the transverse cavity section 28' into adjacent first and second longitudinal sections 32,33 is restricted or retarded, thereby retaining much of the delivered thermoplastic material adjacent to the central portion 29 of the transverse cavity section 28'. Therefore, the central and transverse cavity portions 29,30,31 for forming the head and leg portions 3,4,5 are filled sufficiently with the thermoplastic material, to produce molded coupling elements having exactly the same dimensions with no cells generated therein.

More specifically, in FIG. 6, when the die wheel 14 is rotated in the direction indicated by the arrow A, the just delivered thermoplastic material flows in the directions indicated by the arrows a and b, i.e. to the preceding and succeeding transverse cavity sections 28'. With the previously delivered thermoplastic material partly occupying one of adjacent first and second longitudinal sections 32,33 that leads to the preceding transverse section 28', the flow to the preceding transverse section 28' is restricted. On the other side of the transverse section 28', the flow to the succeeding transverse section 28' is expedited because the other longitudinal section that leads to the succeeding transverse section 28' is empty. If necessary, a pair of auxiliary extrusion nozzles 49,49 may be used to assist the filling of the longitudinal cavity sections 32,33 with the thermoplastic material.

FIGS. 9 and 10 illustrate a pair of continuous slide fastener stringers each produced with use of the strip 1 of FIG. 1 after having been folded on itself along its longitudinal center line (FIG. 2). The folded strip 1 is attached by stitches 46 to a stringer tape 44 along one longitudinal edge thereof.

Figure 11:
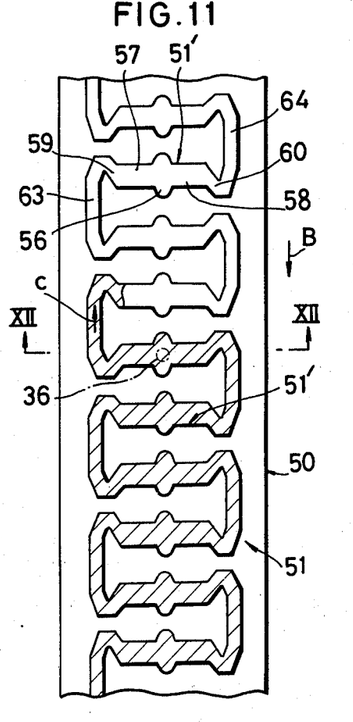
FIG. 11 is a fragmentary plan view of a peripheral surface of a modified die wheel according to a second embodiment.
Figure 12:
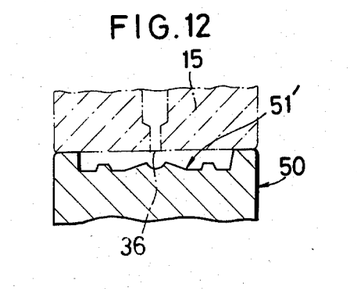
FIG. 12 is a cross-sectional view taken along line XII—XII of FIG. 11.
Figure 13:
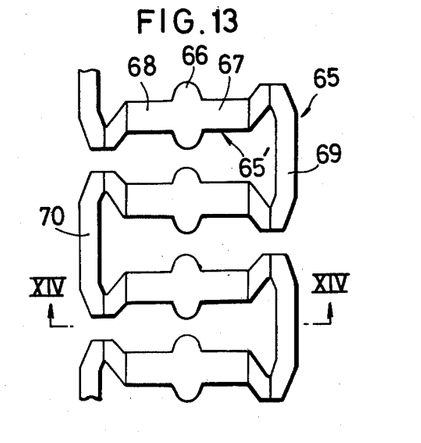
FIG. 13 is an enlarged fragmentary plan view of a continuous coupling element strip produced on the die wheel of FIG. 11.
Figure 14:
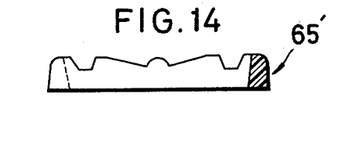
FIG. 14 is a cross-sectional view taken along line XIV—XIV of FIG. 13.

FIGS. 11 and 12 illustrate a modified die wheel 50 according to a second embodiment. The die wheel 50 has in and along its periphery an endless zigzag-shaped cavity 51 including a plurality of substantially parallel transverse sections 51' and a plurality of first and second longitudinal sections 63,64 disposed alternately at opposite sides of the cavity 51 and extending one between each adjacent pair of the transverse sections 51'. FIGS. 13 and 14 show a continuous zigzag-shaped coupling element strip 65 produced on the die wheel 50 and including a series of substantially parallel spaced coupling elements 65' interconnected by a plurality of first and second connecting portions 69,70 alternately disposed at opposite sides of the strip 65 and extending one between each adjacent pair of the coupling elements 65'.

Having a contour corresponding to the shape of a single coupling element 65', each transverse cavity section 51' has an enlarged central portion 56 for forming a head portion 66 of the coupling element 65' and a pair of first and second transverse portions 58,59 extending in opposite directions from the central portion 56 for forming a pair of first and second leg portions 67,68 of the coupling element 65'. Each longitudinal cavity section 63,64 is adapted to form a connecting portion 69, 70 of the coupling element 65'. The first and second transverse portions 58,59 of each transverse cavity section 51' have at their outer ends a pair of first and second bottlenecks or restrictions 59,60, respectively, having reduced width and depth. The bottlenecks 59,60, unlike the bottlenecks 34,35 of FIG. 6, are inclined with respect to the direction of rotation of the die wheel 50.

More specifically, the bottlenecks 59,60 are divided into two groups. Each of the bottlenecks 59,60 of one group is disposed adjacent to one of adjacent longitudinal cavity sections 63,64 that leads to a preceding transverse cavity section 51', and the bottlenecks 59,60 of this group are inclined backwardly with respect to the direction of rotation of the die wheel 50. Each of the bottlenecks 59,60 of the other group is disposed adjacent to the other longitudinal cavity section 63,64 that leads to a succeeding transverse cavity section 51', and the bottlenecks 59,60 of the latter group are inclined forwardly with respect to the direction of rotation of the die wheel 50. In FIG. 11, as the die wheel 50 is rotated in the direction indicated by the arrow B, the thermoplastic material delivered from the extrusion nozzle 36 to one of the transverse cavity sections 51' tends to flow in the direction indicated by an arrow c. With the inclined bottlenecks 59,60, this backward flow is restricted or retarded, and as a result, much of the delivered thermoplastic material is retained in the central and transverse portions 56,58,59 of the transverse cavity section 51'.

Figure 15:
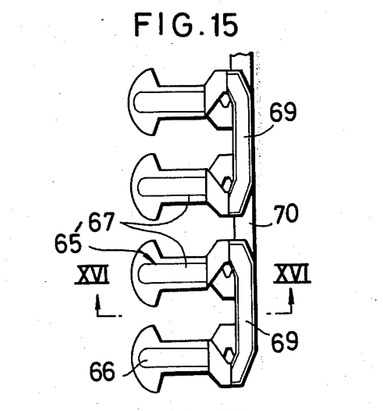
FIG. 15 is a fragmentary plan view of the strip of FIG. 13 after having been folded on itself along its length.
Figure 16:
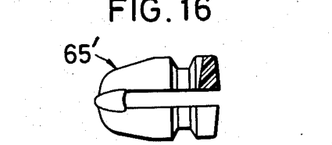
FIG. 16 is a cross-sectional view taken along line XVI—XVI of FIG. 15.
Figure 17:
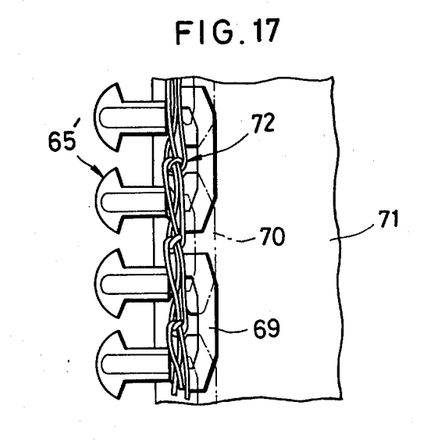
FIG. 17 is a fragmentary plan view of a continuous slide fastener stringer produced with use of the strip of FIG. 15.

FIG. 17 illustrates a continuous slide fastener stringer produced with use of the strip 65 of FIGS. 13 and 14 after having been folded on itself along its longitudinal center line (FIGS. 15 and 16). The folded strip 65 is attached by stitches 72 to a stringer tape 71 along one longitudinal edge thereof.

Figure 18:
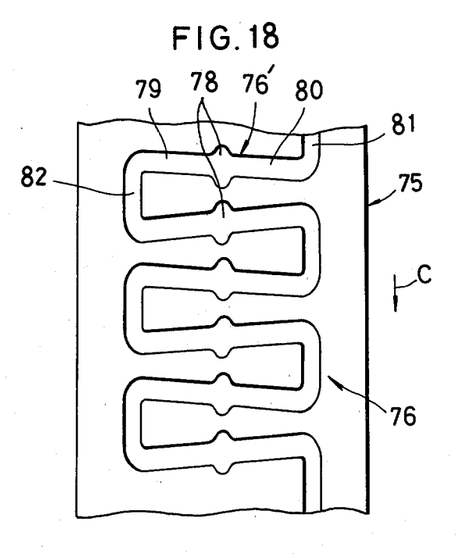
FIG. 18 is a fragmentary plan view of a peripheral surface of a modified die wheel according to a third embodiment.
Figure 19:
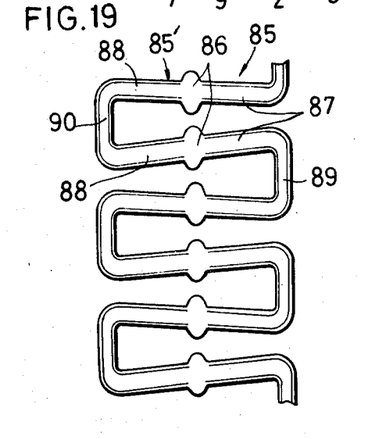
FIG. 19, appearing on Sheet 4, is a fragmentary plan view of a continuous coupling element strip produced on the die wheel of FIG. 18.

FIG. 18 illustrates a modified die wheel 75 according to a third embodiment. The die wheel 75 has an endless zigzag-shaped cavity 76 including a plurality of spaced transverse sections 76' and a plurality of first and second longitudinal sections 81,82 disposed alternately at opposite side of the cavity 76 and extending one between each adjacent pair of the transverse sections 76'. FIG. 19 shows a continuous zigzag-shaped coupling element strip 85 produced on the die wheel 75 and including a series of spaced coupling elements 85' interconnected by a plurality of first and second connecting portions 89,90 alternately disposed at opposite sides of the strip 85 and extending one between each adjacent pair of the coupling elements 85'.

Having a contour corresponding to the shape of a single coupling element 85', each transverse cavity section 76' has an enlarged central portion 78 for forming a head portion 86 of the coupling element 85', and a pair of first and second transverse portions 79,80 extending in opposite directions from the central portion 78 for forming a pair of first and second leg portions 87,88 of the coupling element 85'. Each transverse cavity section 76' is adapted to form a connecting portion 89,90 of the strip 85.

The first and second transverse portions 79,80 of each transverse cavity section 76' are inclined with respect to the direction of rotation (indicated by an arrow C) of the die wheel 75. More specifically, the transverse cavity portions 79,80 are divided into two groups. Each of the transverse cavity portions 79,80 of one group is disposed adjacent to one of adjacent longitudinal cavity sections 81,82 that leads to a preceding transverse cavity section 76', and the transverse cavity portions 79,80 of this group are inclined backwardly with respect to the direction of rotation of the die wheel 75. Each of the transverse cavity portions 79,80 of the other group is disposed adjacent to one of adjacent longitudinal cavity sections 81,88 that leads to a succeeding transverse cavity sections 79,80, and the transverse cavity portions 79,80 of the latter group are inclined forwardly with respect to the direction of rotation of the die wheel 75. In FIG. 18, when the die wheel 75 is rotated in the direction indicated by an arrow C, the thermoplastic material delivered from the extrusion nozzle 36 to one of the transverse cavity sections 76' tends to flow in the opposite direction, i.e. backwardly. With the inclined transverse cavity portions 79,80, this backward flow is restricted or retarded, and as a result, much of the delivered thermoplastic material is retained in the central and transverse portions 78,79,80 of the transverse cavity section 76'.

Figure 20:
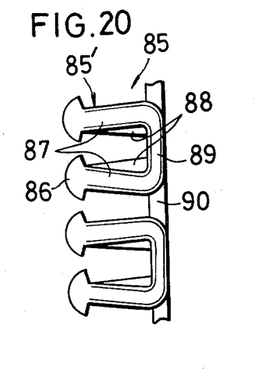
FIG. 20, appearing on Sheet 4, is a fragmentary plan view of the strip of FIG. 19 after being folded on itself along its length.

After having been folded as shown in FIG. 20, the resultant strip 85 may be used in the production of slide fastener stringers.

Figure 21:
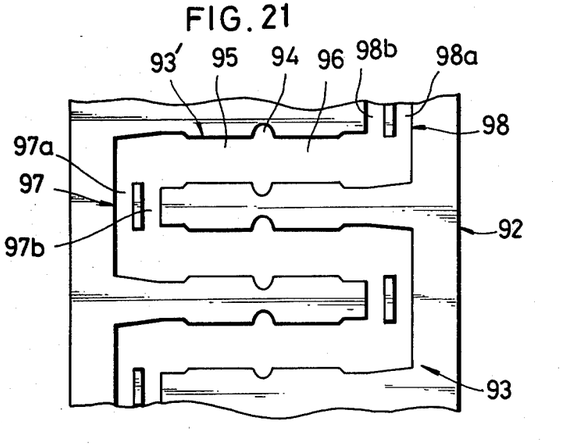
FIG. 21 is a fragmentary plan view of a peripheral surface of a modified die wheel according to a fourth embodiment.
Figure 22:
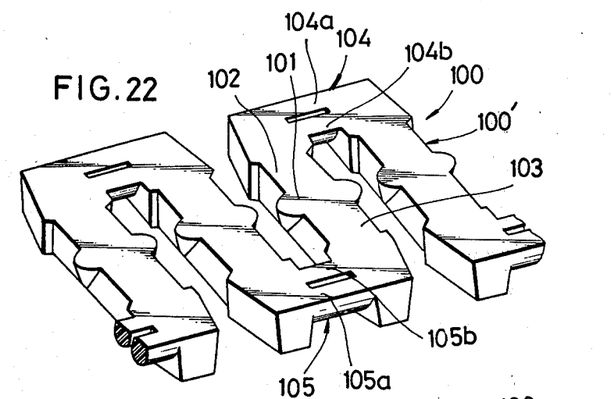
FIG. 22 is a fragmentary perspective view of a continuous coupling element strip produced on the die wheel of FIG. 21.

FIG. 21 illustrates a modified die wheel 92 according to a fourth embodiment. The die wheel 92 has an endless zigzag-shaped cavity 93 including a plurality of substantially parallel spaced transverse sections 93' and a plurality of first and second longitudinal sections 97,98 disposed alternately at opposite sides of the cavity 93 and extending one between each adjacent pair of the transverse sections 93'. FIG. 22 shows a continuous zigzag-shaped coupling element strip 100 produced on the die wheel 92 and including a series of spaced coupling elements 100' interconnected by a plurality of first and second connecting portions 104,105 alternately disposed at opposite sides of the strip 100 and extending one between each adjacent pair of the coupling element 100'.

Having a contour corresponding to the shape of a single coupling element 100', each transverse cavity section 93' has an enlarged central portion 94 for forming a head portion 101 of the coupling element 100', and a pair of first and second transverse portions 95,96 extending in opposite directions from the central portion 100' for forming a pair of first and second leg portions 102,103 of the coupling element 100'.

Each of the longitudinal cavity sections 97,98 is separated into a pair of parallel spaced narrow passageways 97a,97b and 98a,98b, respectively, to restrict or retard the flow of the delivered thermoplastic material through the longitudinal cavity sections 97,98 into the preceding and succeeding transverse cavity sections 93'. As a result, much of the delivered thermoplastic material is retained in the central and transverse portions 94,95,96 of the transverse cavity section 93'. As shown in FIG. 22, each connecting portion 104,105 of the resultant strip 100 is separated into two parts 104a,104b and 105a,105b, respectively.

Figure 23:
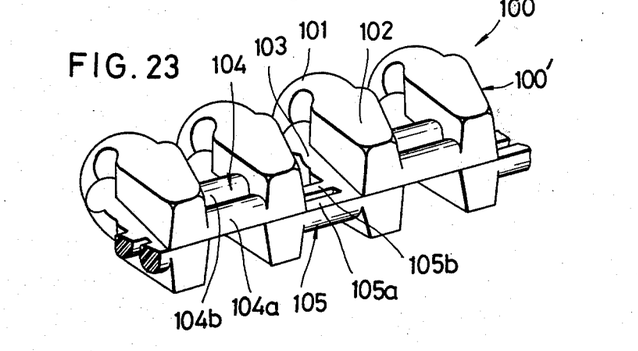
FIG. 23 is a fragmentary perspective view of the strip of FIG. 22 after having been folded on itself along its length.
Figure 24:
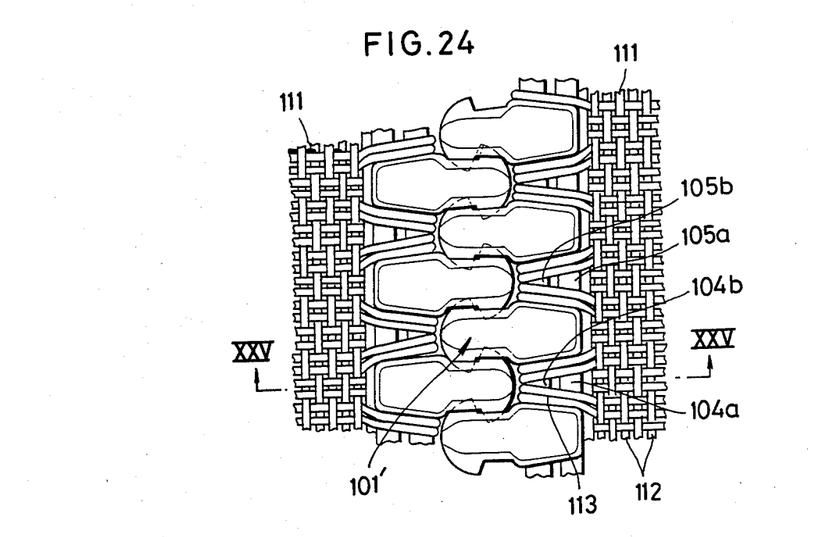
FIG. 24 is a fragmentary plan view of a pair of continuous slide fastener stringers produced with use of the strip of FIG. 23.
Figure 25:
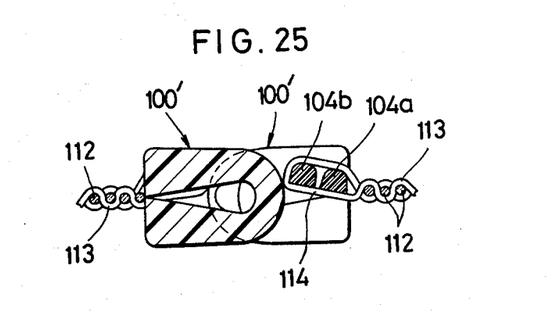
FIG. 25 is a cross-sectional view taken along line XXV—XXV of FIG. 24.

FIGS. 24 and 25 show a pair of continuous slide fastener stringers each produced with the strip 100 of FIG. 22 after having been folded on itself along its longitudinal center line as shown in FIG. 23. The folded strip 100 is woven into a woven stringer tape 111 along one longitudinal edge thereof, the stringer tape 111 including a plurality of warp threads 112 and a weft thread 113. The weft thread 113 has a plurality of loops 114 each encircling the parts 104a,104b,105a,105b of the connecting portions 104,105 between adjacent coupling elements 101'.

Although various minor modifications may be suggested by those versed in the art, it should be understood that I wish to embody within the scope of the patent warranted hereon, all such embodiments as reasonably and properly come within the scope of my contribution to the art.

What is claimed is:

1. A method of molding a continuous zigzag-shaped strip of thermoplastic coupling elements for slide fasteners, comprising:
   (a) continuously rotating a die wheel having an endless zigzag-shaped peripheral cavity including a plurality of substantially parallel transverse sections and a plurality of longitudinal sections disposed alternately at opposite sides of the cavity and extending one between each adjacent pair of the transverse sections, each of the transverse sections having an enlarged central portion for forming a head portion of the individual coupling element, and a pair of transverse portions extending in opposite directions from the central portion for forming a pair of leg portions of the individual coupling element, each of the longitudinal sections being adapted to form a connecting portion extending between an adjacent pair of the coupling elements, the cavity of the die wheel, as the latter is rotated, being advanced such that the central portions of the transverse sections successively pass a fixed extrusion nozzle;
   (b) delivering heated thermoplastic material from the extrusion nozzle to the continuously moving cavity at the central portions of the transverse sections successively; and
   (c) retarding the flow of the delivered thermoplastic material flowing in a path between the central portions of the transverse sections and the longitudinal sections to thereby retain much of the delivered thermoplastic material adjacent to the central portions of the individual transverse sections.

2. An apparatus for molding a continuous zigzag-shaped strip of thermoplastic coupling elements for slide fasteners, comprising:
   (a) a fixed extrusion nozzle for delivering heated thermoplastic material;
   (b) a continuously rotatable die wheel having an endless zigzag-shaped peripheral cavity including a plurality of substantially parallel transverse sections and a plurality of longitudinal sections disposed alternately at opposite sides of said cavity and extending one between each adjacent pair of said transverse sections, each of said transverse sections having an enlarged central portion for forming a head portion of the individual coupling element, and a pair of first and second transverse portions extending in opposite directions from said central portion for forming a pair of first and second leg portions of the individual coupling element, each of said longitudinal sections being adapted to form a connecting portion extending between an adjacent pair of the coupling elements, said cavity of said die wheel, as the latter is rotated, being advanced such that said central portions of said transverse sections successively pass said fixed extrusion nozzle to receive the thermoplastic material therefrom; and
   (c) means for retarding the flow of the delivered thermoplastic material flowing in a path from said central portions of said transverse sections to said longitudinal sections to thereby retain much of the delivered thermoplastic material adjacent to said central portions of said transverse sections.

3. An apparatus according to claim 2, said retarding means comprising a pair of first and second bottlenecks disposed at the outer ends of said first and second transverse portions, respectively, of each said transverse section.

4. An apparatus according to claim 3, one of said bottlenecks of each said transverse section being disposed adjacent to one of an adjacent pair of said longitudinal sections that leads to a preceding one of said transverse sections, the other bottleneck of each said transverse section being disposed adjacent to the other longitudinal section that leads to a succeeding one of said transverse sections, said one bottleneck and said other bottleneck being inclined backwardly and forwardly, respectively, with respect to the direction of rotation of said die wheel.

5. An apparatus for molding a continuous zigzag-shaped strip of thermoplastic coupling elements for slide fasteners, comprising:
   (a) a fixed extrusion nozzle for delivering heated thermoplastic material;
   (b) a continuously rotatable die wheel having an endless zigzag-shaped peripheral cavity including a plurality of substantially parallel transverse sections and a plurality of longitudinal sections disposed alternately at opposite sides of said cavity and extending one between each adjacent pair of said transverse sections, each of said transverse sections having an enlarged central portion for forming a head portion of the individual coupling element, and a pair of first and second transverse portions extending in opposite directions from said central portion for forming a pair of first and second leg portions of the individual coupling element, each of said longitudinal sections being adapted to form a connecting portion extending between an adjacent pair of the coupling elements, said cavity of said die wheel, as the latter is rotated, being advanced such that said central portions of said transverse sections successively pass said fixed extrusion nozzle to receive the thermoplastic material therefrom; and
   (c) each said longitudinal section being separated into a pair of parallel spaced narrow passageways for retarding the flow of the delivered thermoplastic material from said central portions of said transverse sections to said longitudinal sections to thereby retain much of the delivered thermoplastic material adjacent to said central portions of said transverse sections.

6. An apparatus for molding a continuous zigzag-shaped strip of thermoplastic coupling elements for slide fasteners, comprising:

(a) a fixed extrusion nozzle for delivering heated thermoplastic material;

(b) a continuously rotatable die wheel having an endless zigzag-shaped peripheral cavity including a plurality of spaced transverse sections and a plurality of longitudinal sections disposed alternately at opposite sides of said cavity and extending one between each adjacent pair of said transverse sections, each of said transverse sections having an enlarged central portion for forming a head portion of the individual coupling element, and a pair of first and second transverse portions extending in opposite directions from said central portion for forming a pair of first and second leg portions of the individual coupling element, each of said longitudinal sections being adapted to form a connecting portion extending between an adjacent pair of the coupling elements, one of said transverse portions of each said transverse section being disposed adjacent to one of an adjacent pair of said longitudinal sections that leads to a preceding one of said transverse sections, the other transverse portion of each said transverse section being disposed adjacent to the other longitudinal section that leads to a succeeding one of said transverse sections, said cavity of said die wheel, as the latter is rotated, being advanced such that said central portions of said transverse sections successively pass said fixed extrusion nozzle to receive the thermoplastic material therefrom; and (c) said one transverse portion and said other transverse portion of each said transverse section being inclined backwardly and forwardly, respectively, with respect to the direction of rotation of said die wheel for retarding the flow of the delivered thermoplastic material from said central portions of said transverse sections to said longitudinal sections to thereby retain much of the delivered thermoplastic material adjacent to said central portions of said transverse sections.

\* \* \* \* \*